May 28, 1935. F. P. BUCKLEIN 2,002,764
BRAKE TESTING MACHINE
Filed March 13, 1929
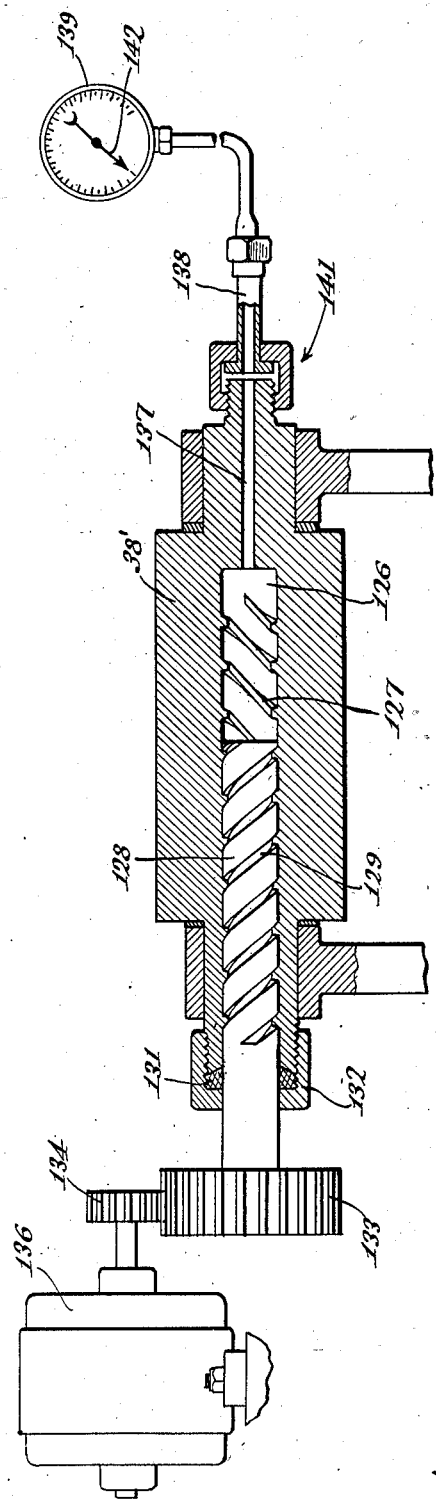
Inventor
F. P. Bucklein
By Hazard and Miller
Attorneys.

Patented May 28, 1935

2,002,764

UNITED STATES PATENT OFFICE 2,002,764

BRAKE TESTING MACHINE

Frank P. Bucklein, Los Angeles, Calif., assignor to Bucklein Manufacturing Corporation, Ltd.

Application March 13, 1929, Serial No. 346,627

4 Claims. (Cl. 265—25)

This invention relates to brake testing machines, and has for an object the provision of a novel and unusually efficient type of machine for testing vehicle brakes.

A more detailed object is the provision of a brake testing machine wherein a wheel engaging roller is adapted to be revolved by means of a driving member threaded axially thereto, with the result that longitudinal displacement of the driving member occurs in respect to the roller, in proportion to the resistance to the roller's turning set up by the wheel engaged by the roller.

Another object of the invention is the provision of a brake testing machine adapted to generate hydraulic pressure in proportion to the efficiency of the braking mechanism being tested, and also provided with indicating means responsive to variations of such hydraulic pressure.

A more detailed object is the provision of a brake testing machine comprising a roller adapted to engage a vehicle wheel and to be rotated so that the wheel is driven thereby. The means for driving the roller, includes a screw shaft which is movable longitudinally in respect to the driven member engaged thereby, and a portion of the shaft is received within a closed chamber containing hydraulic fluid, with the result that the thrust of the shaft resulting from rotational resistance set up by the driven member, is transmitted into hydraulic pressure, the magnitude of which may be ascertained by any suitable type of indicating means.

Another object is the provision of a brake testing machine operating upon the above described hydraulic principle, which may be driven in any one of several manners, there being optionally individual roller driving means, or a common prime mover, coupled to several rollers, it being understood that each of these several rollers is adapted to engage a separate wheel of the vehicle.

The invention possesses other objects and advantageous features, some of which, with those enumerated, will be set forth in the following description of the invention's particular embodiment which is illustrated in the drawing accompanying and forming a part of the specification.

Referring to the drawing:

The figure is an enlarged, detail vertical sectional view of another modified form of the invention.

In terms of broad inclusion, the brake testing machine of the present invention, comprises a roller adapted to engage and impart rotational movement to a vehicle wheel, the means for driving the roller being a member threaded axially of the roller, or axially of some interposed driving member, with the result that relative longitudinal displacement of the threaded driving member and the member driven thereby, occurs when resistance to the roller's rotation is set up by the wheel. This displacement may be measured, and from the magnitude thereof, the efficiency of the brake with which the wheel is provided, may be determined.

Referring to the accompanying drawing, wherein similar reference characters designate similar parts throughout, the invention in its preferred form is disclosed, wherein the roller 38' which is adapted to engage and partially support each of the wheels of the vehicle, is provided with an axial bore 126 provided with threads 127 of relatively steep pitch. Threadedly engaged therewith, is a screw shaft 128, the threads 129 of which are complementary to the threads 127. The screw shaft 128 extends through a packing 131 compressed about the shaft by a gland nut 132. A driven gear 133 rigid with the shaft 128, is enmeshed with a driving gear 134; and since the shaft 128 will, during operation, move longitudinally the gear 133 is preferably wider than the driving gear 134. The gear 134 may be connected to any suitable driving means such as a motor 136.

A duct 137 communicating with the chamber 126, extends through the opposite end of the roller 38', and communicates with a conduit 138 leading to a pressure indicator 139. The conduit 138 is connected to the roller 137, by any suitable swivel union 141.

When the roller 38' is engaged by the wheel of a vehicle, the brake associated with that wheel, may be tested by rotating the roller 38' through the driving means 136, and then applying the brake. This will set up a resistance to rotation of the roller 38, whereupon the screw shaft 128 will tend to thread itself longitudinally in respect to the roller 38'. Of course, this will vary the effective capacity of the chamber 126, changing the pressure of the hydraulic fluid therein, and this pressure which is made manifest by the indicating hand 142 of the gauge 139, the extent of this movement being proportional to the efficiency of the brake being tested.

It will be noted in the form of construction disclosed that the end of the driving shaft or screw bears directly against the fluid which transmits the pressure to the pressure indicating device. By such a construction there is no lost motion between the driving member or screw and the liquid. In this manner the liquid serves a double function of resisting longitudinal movement of the screw so as to cause it to turn the roller and, in addition, serves to transmit directly the pressure generated to the pressure measuring device.

It is to be understood that the details of the invention as herein disclosed, are subject to alteration within the spirit or scope of the appended claims.

I claim:

1. In a vehicle brake testing machine, a roller mounted for rotary movement while in engagement with a vehicle wheel, a screw, means operatively connecting the screw to said roller to effect turning of the roller by turning the screw, means providing a chamber, said screw extending into and being movable longitudinally in respect to the chamber, a fluid in the chamber, and a measuring device communicating with said chamber, said measuring device being responsive to pressure variations of said fluid.

2. In a vehicle brake testing machine, a roller mounted for rotary movement while in engagement with a vehicle wheel, a screw, means operatively connecting the screw to said roller to effect turning of the roller by turning the screw, said screw having a portion extending into and being movable longitudinally in respect to a chamber within said roller, a fluid in the chamber, and a measuring device communicating with said chamber, said measuring device being responsive to pressure variations of said fluid.

3. A brake testing machine comprising a wheel engaging roller having a longitudinally axial bore internally threaded therein, a threaded shaft extending into the bore with its threads meshing with the threads of the bore, said shaft being mounted for rotation and longitudinal movement, means for rotating the shaft, and means resisting longitudinal movement of the shaft with respect to the roller, said means serving to measure forces longitudinally effective upon the shaft.

4. A brake testing machine comprising a wheel engaging roller having a longitudinally axial bore internally threaded therein, a threaded shaft extending into the bore with its threads meshing with the threads of the bore, said shaft being mounted for rotation and longitudinal movement, means for rotating the shaft, a fluid confined in the roller against the end of the shaft, and means for measuring the presure developed in the fluid by the longitudinal movement of the shaft relatively to the roller.

FRANK P. BUCKLEIN.